I. WHEELER.
Improvement in Milk-Coolers.
No. 132,880. Patented Nov. 5, 1872.
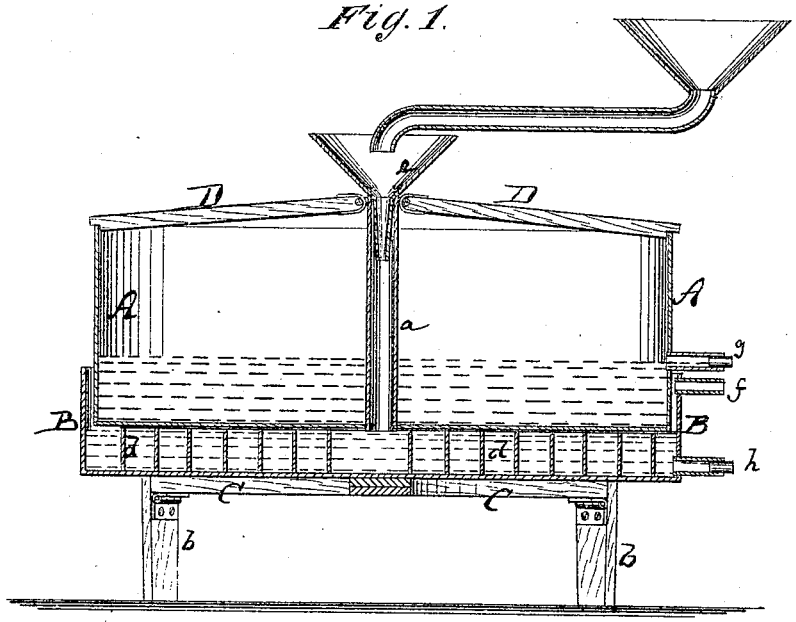
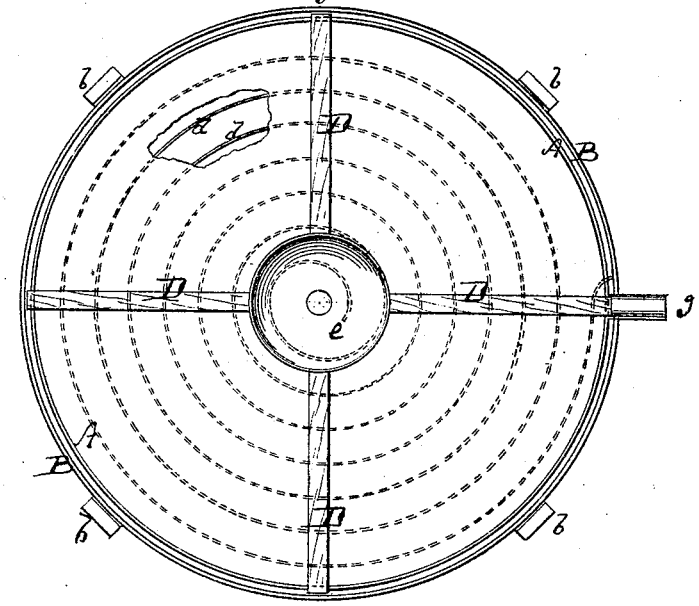
Witnesses:
E. Wolff
Sedgwick
Inventor:
I. Wheeler
per
Attorneys.

UNITED STATES PATENT OFFICE.

IRVING WHEELER, OF MASSENA, NEW YORK.

IMPROVEMENT IN MILK-COOLERS.

Specification forming part of Letters Patent No. 132,880, dated November 5, 1872.

*To all whom it may concern:*

Be it known that I, IRVING WHEELER, of Massena, in the county of St. Lawrence and State of New York, have invented a new and Improved Milk-Cooler, of which the following is a specification:

Figure 1 is a vertical central section of my improved milk-cooler. Fig. 2 is a top view of the same.

Similar letters of reference indicate corresponding parts.

This invention relates to an improved milk-cooler by which a small quantity of water can be made to absorb nearly all the animal heat of the milk for the purpose of preparing it for market or for churning. The invention consists in the arrangement of a spiral water-chamber beneath the milk-pan for obtaining a large circulating-channel, and, consequently, fully utilizing the heat-absorbing qualities of the water.

In the accompanying drawing, the letter A represents the milk-pan made cylindrical, of sheet metal or other suitable material, with a pipe, $a$, projecting from the center of its bottom upward. B is the water-chamber or vessel, also of cylindrical form, slightly larger in diameter than the pan A. It is supported on a frame, C, or other support, said frame when used having hinged legs $b$, as shown in Fig. 1, which legs project upward of the horizontal support or table to hold the vessel B in place. Within the vessel B is arranged a spiral plate, $d$, which projects vertically from its bottom and produces a spiral channel or conduit from the center to the circumference of the pan B. The milk to be cooled is poured into the vessel A, which is placed into B and supported there on the upper edge of the spiral plate $d$. Water is poured through a funnel, $e$, into the pipe $a$ and flows thence into the spiral conduit that is formed by the plate $d$. When it reaches the circumference of the vessel B it flows off through a pipe, $f$, near the top of the vessel B; thus the warmer water only overflows, the cooler remaining in the vessel B. $g$ is a pipe in the pan for the withdrawal of the milk therefrom. $h$ is a pipe in the lower part of B for the entire withdrawal of all the water when required. D is a frame, composed of bars, hinged to a ring that rests on a shoulder on the upper end of the tube $a$, the outer ends of the bars bearing against the circumference of the pan A. This frame D serves as a support for netting, by which insects are kept away from the milk.

Having thus described my invention, I claim as new and desire to secure by Letters Patent—

1. The combination of the pan A and tube $a$ and vessel B, spiral plate $d$, pipes $h$ and $g$ with each other, as set forth.

2. The frame C provided with hinged legs that project above the horizontal top or platform, as set forth.

IRVING WHEELER.

Witnesses:
IRA A. GOODRIDGE,
H. GUILD.